United States Patent [19]

Uchida

[11] Patent Number: 4,694,332
[45] Date of Patent: Sep. 15, 1987

[54] COLOR IMAGE READER

[75] Inventor: Satoru Uchida, Atsugi, Japan

[73] Assignee: Ricoh Company, Ltd., Tokyo, Japan

[21] Appl. No.: 827,267

[22] Filed: Feb. 7, 1986

[30] Foreign Application Priority Data

Feb. 15, 1985 [JP] Japan .................. 60-26372

[51] Int. Cl.[4] .............................. H04N 1/46
[52] U.S. Cl. ......................... 358/75; 358/41; 350/173; 350/169
[58] Field of Search .......... 358/75, 41, 50, 54, 358/55; 350/169, 172, 170, 173; 356/402, 416, 419

[56] References Cited

U.S. PATENT DOCUMENTS

| | | | |
|---|---|---|---|
| 1,460,706 | 7/1923 | Comstock | 350/173 |
| 2,189,932 | 2/1940 | Ball et al. | 350/173 |
| 2,189,933 | 2/1940 | Ball et al. | 350/173 |
| 3,449,039 | 7/1965 | Hoffman, Jr. | 350/169 |
| 3,922,069 | 11/1975 | Kishikawa et al. | 358/50 X |
| 3,942,154 | 3/1976 | Akami et al. | 358/75 X |
| 4,093,354 | 6/1978 | Leeb | 350/170 X |
| 4,358,200 | 11/1982 | Heemskerk et al. | 350/172 X |
| 4,392,729 | 7/1983 | Tsunefuji | 350/172 X |
| 4,597,630 | 7/1986 | Brandstetter et al. | 350/170 X |

Primary Examiner—James J. Groody
Assistant Examiner—E. Anne Toth
Attorney, Agent, or Firm—Oblon, Fisher, Spivak, McClelland, & Maier

[57] ABSTRACT

A color image reader for decomposing two-color images into independent color components includes a color-separating mirror which is provided with a multilayer interference filter on one of opposite major surfaces thereof. The other surface of the mirror serves as a reflection surface. Image light incident to the mirror is separated into two different color components which are then redirected to propagate in the same direction. The two color components respectively are focused to different line image sensors.

5 Claims, 2 Drawing Figures

COLOR IMAGE READER

BACKGROUND OF THE INVENTION

The present invention relates to a color image reader for reading two-color images by decomposing them into independent color components.

Some modern facsimile apparatuses have a capability for transmitting a document in which, for example, particular information to be stressed is written or underlined in red. Various types of color image readers have been proposed and put to practical use for implementing such a capability, i.e. reading two-color information. The prior art color image readers which are capable of reading red information as well, for example, may generally be classified into two types, i.e. a light source sequential type and a filter separation type. The light sequential type image reader is such that two light sources, one emitting white light and the other red light, illuminate a document so that reflections from the document are read by line image sensors. The filter separation type, on the other hand, is such that a light source emitting white light illuminates a document to cause the reflection to be focused by an imaging device and, while a dichroic mirror, a dichroic prism or the like separates the focused light into a red component and the other, line image sensors read the color components.

The problem with the light source sequential scheme is that since the positions to be illuminated by the two light sources are remote from each other, intricate processing is necessary for output signals of the two line image sensors to be mixed. The filter separation scheme has the drawback that since the light components separated by the dichroic mirror or prism are propagated at an angle of 90 degrees to each other, the arrangement intervening between the imaging device and the image sensors is disproportionately complicated.

SUMMARY OF THE INVENTION

It is therefore an object of the present invention to provide a color image reader which eliminates the drawbacks particular to the prior art devices as described above.

It is another object of the present invention to provide a color image reader which is capable of separating image light by means of a simple construction.

It is another object of the present invention to provide a generally improved color image reader.

In accordance with one aspect of the present invention, there is provided a color image reader for reading images which are printed in a document in a plurality of colors comprising a color-separating mirror comprising a transparent elongate member two major surfaces of which intersect each other at a predetermined angle, a multi-layer interference filter provided on one of the major surfaces for reflecting a predetermined color component and transmitting the other color component, and a reflection surface provided on the other major surface for reflecting the other color component, image light representative of the color images of the document being incident to the filter at a predetermined angle so that first reflected image light containing only the predetermined color component is reflected by the filter and second reflected image light containing the other color component is reflected by the reflection surface, and a first and a second line image sensors for converting respectively the first reflected image light and the second reflected image light to image signals.

In accordance with another aspect of the present invention, there is provided a color-separating mirror having a transparent elongate member which separates image light consisting of a plurality of color components, comprising two major surfaces which intersect each other at a predetermined angle, a multilayer interference filter provided on one of the major surfaces for reflecting a predetermined color component and transmitting the other color components, and a reflection surface provided on the other major surface for reflecting the other color components, image light representative of the color images of the document being incident to the filter at a predetermined angle so that first reflected image light containing only the predetermined color component is reflected by the filter and second reflected image light containing the other color component is reflected by the reflection surface.

The above and other objects, features and advantages of the present invention will become more apparent from the following detailed description taken with the accompanying drawings.

DESCRIPTION OF THE PREFERRED EMBODIMENT

While the color image reader of the present invention is susceptible of numerous physical embodiments, depending upon the environment and requirements of use, a substantial number of the herein shown and described embodiment have been made, tested and used, and all have performed in an eminently satisfactory manner.

Figure 1:
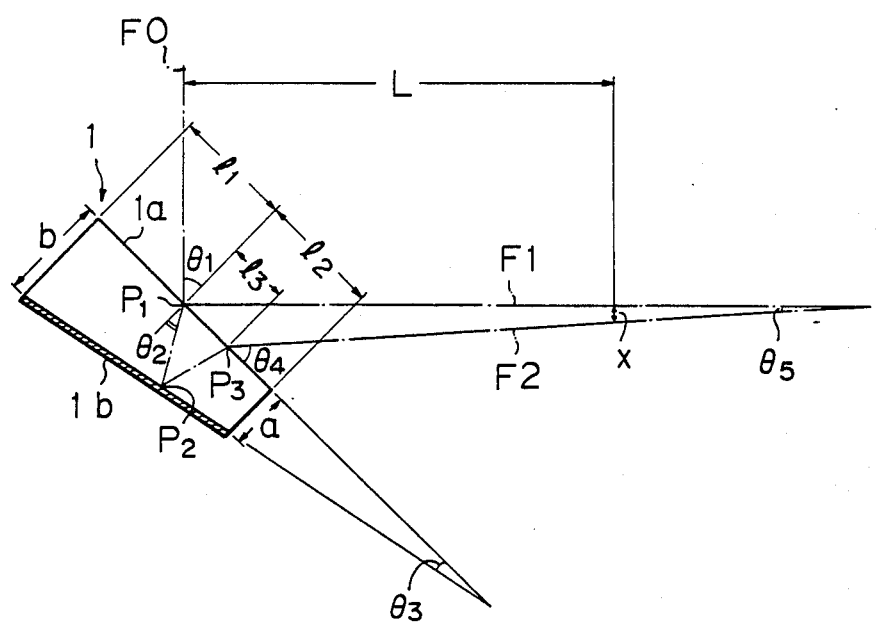
FIG. 1 is a schematic diagram representative of a color-separating mirror in accordance with the present invention.

Referring to FIG. 1, a color-separating mirror which is applicable to an embodiment of the color image reader of the present invention is shown. As shown, the mirror, generally 1, comprises an elongate glass plate which serves as a base. In a sectional view, the glass plate resembles a wedge which is void of an apex portion. A multi-layer interference filter (dichroic filter) is deposited on one 1a of opposite major surfaces of the glass plate, while a reflection surface is provided on the other major surface 1b. The interference filter is adapted to reflect a color component which is to be separated from the other, e.g. red. The interference filter is produced by alternately depositing a non-absorbing substance having a high refractive index and a non-absorbing substance having a low refractive index by evaporation, while suitably selecting the thickness of each layer and the total number of layers. With this structure, the interference filter reflects light which lies in a particular wavelength range (red in this particular embodiment) while transmitting light belonging to the other wavelength range, due to interference of light. The particular wavelength range mentioned above is determined by the thickness of each layer and the number of layers. The reflection surface 1b of the glass plate may be implemented by deposition of aluminum, for example.

Assume that image light F0 is incident to the surface of the color-separating mirror 1. Then, a red component F1 contained in the image light F0 is reflected by the interference filter on the surface $1a$, while on the other color component F2 is allowed into the mirror 1 and, then, reflected by the reflection surface $1b$ to propagate again through the mirror 1 toward the surface $1a$. The light components F1 and F2 coming out of the mirror 1 via the surface $1a$ are routed substantially in the same direction such that their optional axes intersect each other.

Now, assume that the angle of incidence of the image light F0 to the surface $1a$ is $\theta_1$, the point of incidence is $P_1$, the angle of refraction of the light F2 is $\theta_2$, the point of reflection of the light F2 on the reflection surface $1b$ is $P_2$, the complementary angle to the angle of refraction from the surface $1a$ to the outside when the light F2 has propagated through the mirror 1 to the surface $1a$ is $\theta_4$, the angle of intersection of the light F1 and F2 is $\theta_5$, the apex angle of the mirror 1 as viewed in a section is $\theta_3$, the length of a longer side of the mirror as viewed in a section is b, and that of a shorter side is a, the point of incidence of the light F2 to the surface $1a$ is $P_3$, the distance between the longer side of the mirror 1 as viewed in a section and the point $P_1$ is $l_1$, the distance between the shorter side of the same and the point $P_1$ is $l_2$, and the distance between the points $P_1$ and $P_3$ is $l_3$. Then, the distance x between the light components F1 and F2 at a point which is spaced a distance L from the point $P_1$ in the reflection direction of the component F1 is expressed as:

$$x = \tan \theta_5 ((l_3 \sin \theta_4 / \sin \theta_5) - L) \quad \text{Eq. (1)}$$

where $$l_3 = \frac{b \sin \theta_2 \cos \theta_3 (l_2 \tan \theta_3 + a)}{((l_1 + l_2) \tan \theta_3 + a) \cos (\theta_2 - \theta_3)}$$

$$\theta_4 = \arcsin (n_2 \sin (\theta_2 - 2\theta_3)/n_1)$$

$$\theta_5 = \theta_1 + \theta_4 - 90°$$

$$\theta_3 = \arcsin (b/(b^2 + (b(l_1 + l_2)/(a - b))^2$$

It is to be noted that all the angles stated above are expressed in terms of degrees and $n_1$ and $n_2$, respectively, are the refractive indices of the outside and the inside of the mirror 1.

It will be understood from the Eq. (1) that so long as the angle of incidence of the image light F0 to the mirror 1 is constant, the distance x between the light components F1 and F2 can be determined from the distance L from the point $P_1$ of incidence of the light F0 by varying the angle of intersection of the surfaces $1a$ and $1b$ of the mirror 1.

Figure 2:
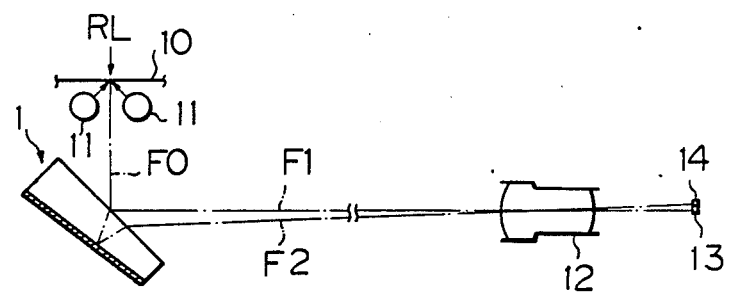
FIG. 2 is a schematic view of a color image reader embodying the present invention.

Referring to FIG. 2, a preferred embodiment of the color image reader of the present invention which uses the mirror 1 as described above is shown. Light sources 11 illuminate a document 10 along a read line RL. The image light F0 reflected by the document 10 is incident to the mirror 1 which has the previously described structure. The mirror 1 separates the image light F0 to a red component F1 and the other color component F2 by the previously discussed procedure. The components F1 and F2 are converged by a lens 12 to be focused on line image sensors 13 and 14, respectively. As a result, the line image sensor 13 produces an image signal associated with the red image component, and the line image sensor 14 an image signal associated with the other color image component.

In FIG. 2, drive and control arrangements for the line image sensors 13 and 14, transport and control arrangements associated with the document are not shown because they are not directly relevant to the present invention.

In summary, it will be seen that the present invention provides a color image sensor which successfully separates image light despite an unprecedented simple construction. This advantage is derived from the use of a color-separating mirror having a substantially wedge-like section and provided with a multi-layer interference filter on one surface and a reflection surface on the other. With such a mirror, the color image reader separates image light into two different color components, redirects the two components to the same direction, and focuses the color components to independent line image sensors.

Various modifications will become possible for those skilled in the art after receiving the teachings of the present disclosure without departing from the scope thereof. For example, the particular sectional shape of the mirror 1 which is a wedge void of the apex as shown and described is not restrictive. The gist is that the two major surfaces of the mirror 1 be not parallel to each other but angled a predetermined (accute) angle to each other. Further, the color to be separated from the others is not limited to red.

What is claimed is:

1. A color image reader for reading images which are printed in a document in a plurality of colors, comprising:
    a color-separating mirror comprising a transparent elongate member two major surfaces of which intersect each other at a predetermined angle, a multi-layer interference filter provided on one of said major surfaces for reflecting a predetermined color component and transmitting the other color component, wherein said filter is produced by alternately depositing by evaporation a non-absorbing material having a high refractive index and a non-absorbing material having a low refractive index, while selecting a predetermined thickness for each of layers and a total number of the layers, and a reflection surface provided on the other major surface for reflecting said other color component, image light representative of color images of the document being incident to said filter at a predetermined angle so that first reflected image light containing only said predetermined color component is relected by the filter and a second reflected image light containing the other color component is reflected by the reflection surface; and
    a first and a second line image sensors for converting respectively the first reflected image light and the second reflected image light to image signals.

2. A color image reader as claimed in claim 1, further comprising focusing means for focusing the first reflected image light and the second reflected image light.

3. A color image reader as claimed in claim 1, wherein the predetermined color component is a red component.

4. A color image reader as claimed in claim 1, wherein a wavelength of the predetermined color component is determined by the thickness of each of the layers and the total number of the layers.

5. A color-separating mirror having a transparent elongate member which decomposes image light consisting of a plurality of color components, comprising two major surfaces which intersect each other at a predetermined angle, a multi-layer interference filter provided on one of said major surfaces for reflecting a predetermined color component and transmitting the other color components, wherein said filter is produced by alternately depositing by evaporation a non-absorbing material having a high refractive index and a non-absorbing material having a low refractive index, while selecting a predetermined thickness for each of layers and a total number of the layers, and a reflection surface provided on the other major surface for reflecting said other color components, image light represenive of color images of a document being incident to said filter at a predetermined angle so that first reflected image light containing only said predetermined color component is reflected by the filter and second reflected image light containing the other color component is reflected by the reflection surface.

* * * * *